United States Patent [19]
Woods

[11] Patent Number: 6,154,999
[45] Date of Patent: Dec. 5, 2000

[54] FISHING LURE

[76] Inventor: Todd D. Woods, 2305 Louita Ave., Kingsport, Tenn. 37665

[21] Appl. No.: 09/323,532

[22] Filed: Jun. 1, 1999

[51] Int. Cl.⁷ .................................................. A01K 85/00
[52] U.S. Cl. ...................... 43/42.25; 43/42.1; 43/42.28; 43/42.26; 43/42.39
[58] Field of Search .......................... 43/42, 42.06, 42.1, 43/42.24, 42.25, 42.26, 42.39, 42.28

[56] References Cited

U.S. PATENT DOCUMENTS

| | | | |
|---|---|---|---|
| D. 229,933 | 1/1974 | Fitzpatrick | D22/27 |
| D. 354,329 | 1/1995 | Long | D22/132 |
| 1,267,627 | 5/1918 | Campbell . | |
| 3,724,117 | 4/1973 | Flanagan, Jr. | 43/42.24 |
| 4,158,927 | 6/1979 | Capra | 43/4.5 |
| 4,845,883 | 7/1989 | Langer | 43/42 |
| 4,856,223 | 8/1989 | Evans | 43/42 |
| 5,438,790 | 8/1995 | Rigney | 43/42.24 |
| 5,862,623 | 1/1999 | MacPherson | 43/42.24 |
| 5,934,008 | 8/1999 | Rice | 43/42.26 |

*Primary Examiner*—Jack W Lavinder

[57] ABSTRACT

A fishing lure having a substantially flat, elongated body portion having a generally rectangular outline and having a dorsal side and an underside and a front end and a tail end and being formed of highly flexible fabric material such as to be wiggly deformable by small water currents generated when pulled thru water. A head portion is provided on the front end and has a forwardly facing insect-like bulbous nose section integral with a rearwardly directed shank section. A forwardly facing hook is affixed to the head portion and depends outwardly and downwardly from the underside. Several pairs of fine, insect-like, semi-rigid, resilient legs are mounted on the body portion and protrude outwardly therefrom. A throat-like segment of fibrous fuzzy material is affixed to the underside of the shank section, and a line eye is mounted on the underside of the nose section.

3 Claims, 2 Drawing Sheets

FISHING LURE

BACKGROUND OF THE INVENTION

1. Field

This invention concerns fishing lures, particularly of the type which resembles natural worms or insects. Particularly concerned are lures which have flexible bodies and are constructed such that when drawn thru the water the lure body undulates and/or wiggles to simulate the action of live bait.

2. Prior Art

Heretofore lures of this general type have been proposed such as those of U.S. Pat. Nos. 1,734,346; 2,231,949; 2,242,708; 3,079,723; 4,186,510; D105,158; D191,669; D217,765; D229,933; D255,703 and D295,998. None of these lures however, give the near perfect simulation of live, worm-like bait. In this regard, the present lure, which can be of any desired color or combination and of any size and weight, was designed to simulate some of the fresh water fishing most sought after natural live baits. The undulating motion of the present lure simulating the hellgrammite and the leech is what makes this bait so effective. The lure correctly imitates nature. With a twitch of the rod tip, the erratic motion of this lure will even make non-aggressive fish strike. Some other lures may have more appeal to the fisherman, but stiff plastic and rubber cannot produce the fluid motion of this simple, yet effective design. Extensive testing in a variety of environments has proven this lure to be durable, versatile and highly effective.

SUMMARY OF THE INVENTION

The present lure comprises a substantially flat, elongated body portion having a generally rectangular outline and having a dorsal side and an underside and a front end and a tail end and comprised of highly flexible material such as to be wiggly deformable by small water currents generated when pulled thru water. A head portion is provided on said front end and has a forwardly facing insect-like bulbous nose section integral with a rearwardly directed shank section. A forwardly facing hook is affixed to the head portion and depends outwardly and downwardly from the underside, multiple pairs of fine, insect-like, semi-rigid, resilient legs are mounted on the body portion and protrude outwardly therefrom, and a throat-like segment of fibrous material is affixed to the underside of the shank section, and a line eye is mounted on the underside of the nose section.

BRIEF DESCRIPTION OF THE DRAWINGS the invention will be further understood from the following description and drawings wherein.

DETAILED DESCRIPTION

Figure 1:
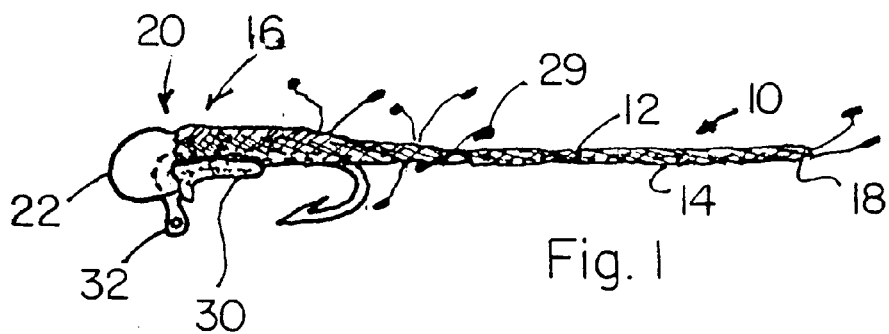
FIG. 1 is a side view of the present lure wherein the body portion is shown flattened out for clarity.
Figure 2:
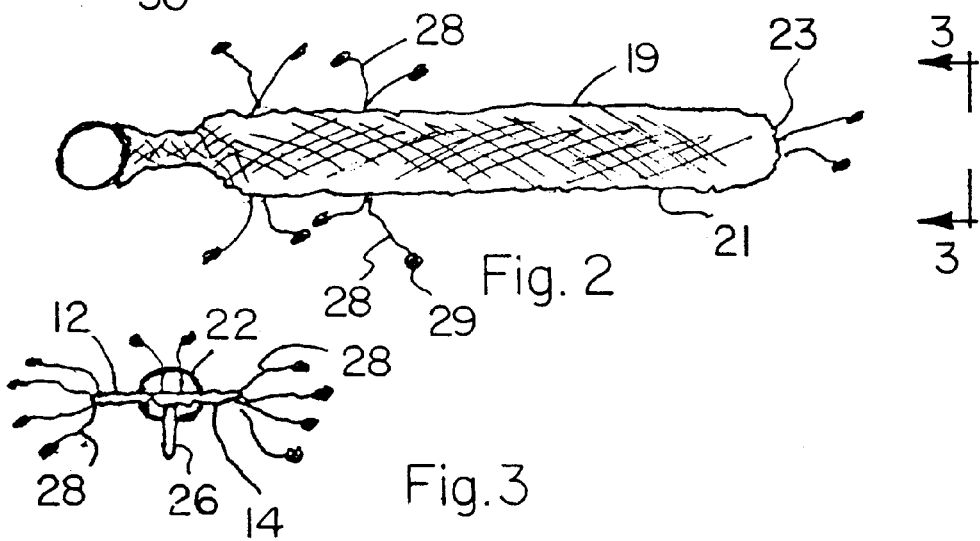
FIG. 2 is a top or dorsal view of the lure.
Figure 3:
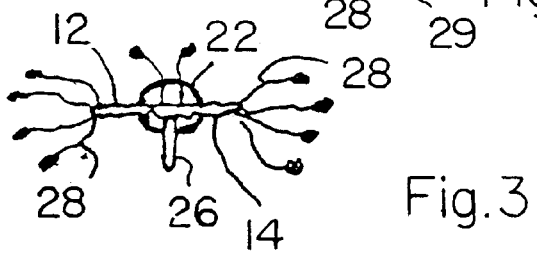
FIG. 3 is a tail end view taken in the direction of line 3—3 in FIG. 2.
Figure 4:
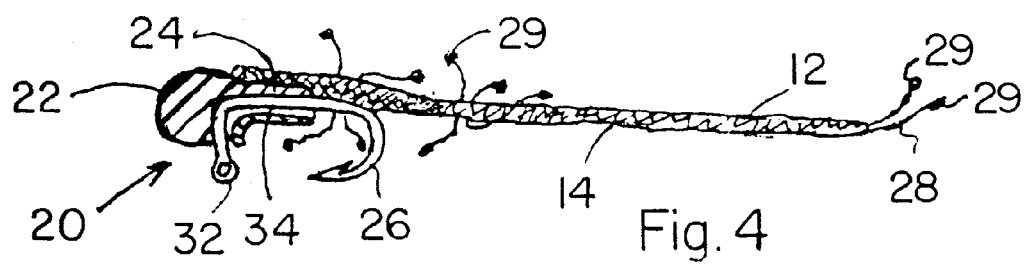
FIG. 4 is a partially sectioned view of FIG. 1 with the portion which is sectional being bracketed.
Figure 5:
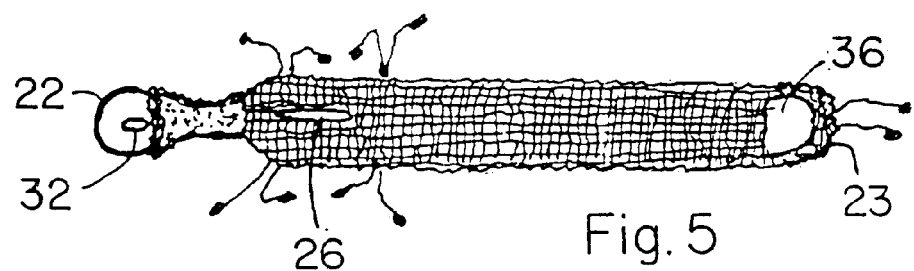
FIG. 5 is a view of a flatened out view of the underside of the lure.
Figure 6:
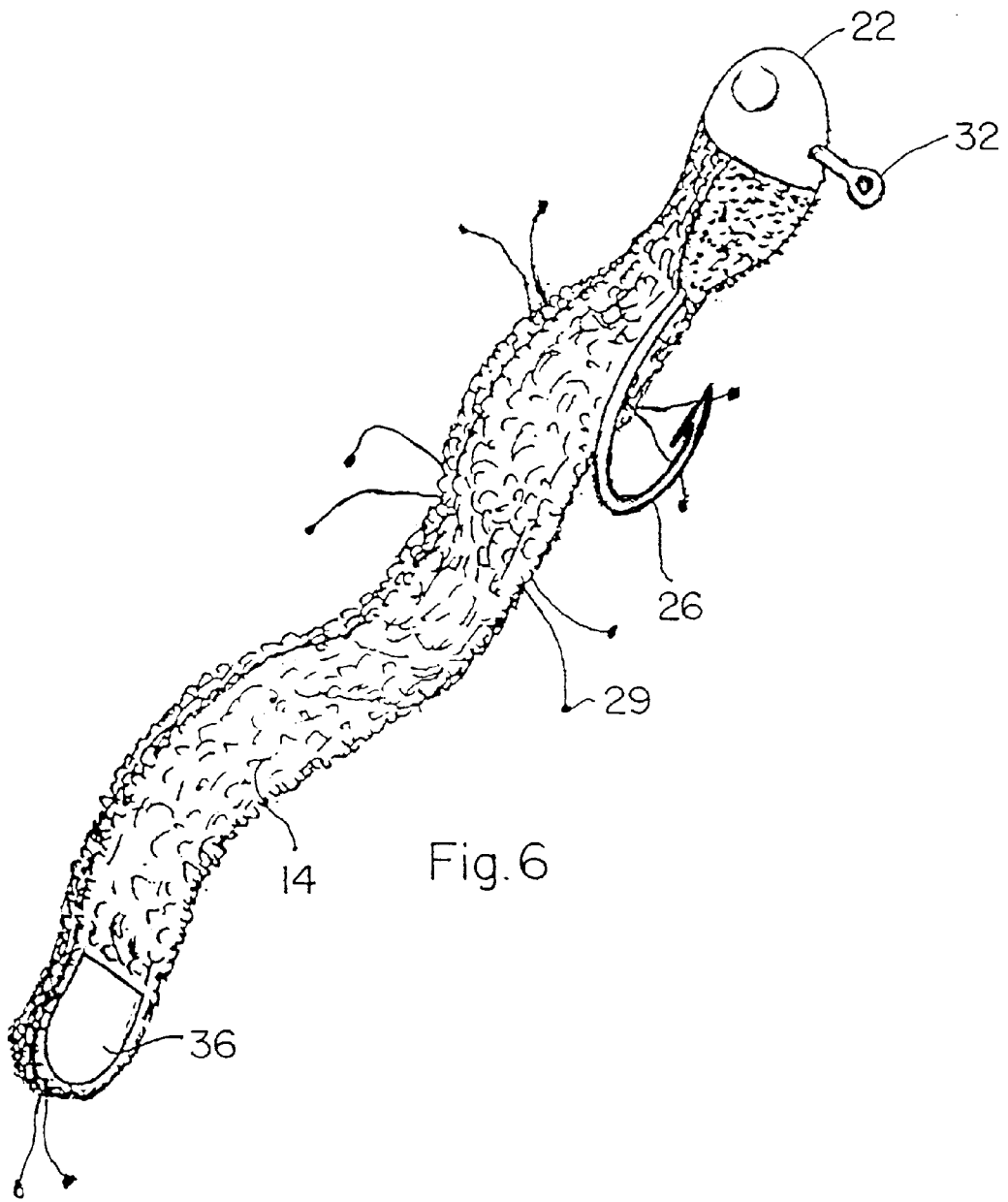
FIG. 6 is a view of the underside of the lure in an undulated posture such as when being drawn thru water.

The present lure, with reference to the claims hereof, comprises a substantially flat, elongated body portion 10 having a generally rectangular outline and having a dorsal side 12 and an underside 14 and a front end 16 and a tail end 18, generally parallel side edges 19 and 21, a tail end edge 23, and comprised of highly flexible material such as woven cloth or more bulky fabric such as fabric knitted or formed with a pile, of water insoluble synthetic material including polyester, polyamide, cellulose ester, polyolefin, and the like. The fabric preferably is somewhat stretchable and resilient such as fairly loosely woven material more clearly shown in FIG. 5 to allow the lure body to be wiggly deformable by small water currents generated when pulled thru water.

The front end 16 of the lure body is affixed by gluing or the like to a head portion 20 having a forwardly facing insect-like bulbous nose section 22 integral with a rearwardly directed shank section 24. A forwardly facing hook means 26 is affixed to the head portion and depends outwardly and downwardly from the underside of the lure body. The head portion 20 is of any substantially solid material such as molded metal, ceramic or plastic which preferably is formed around the shank 34 of hook 26 to firmly mount the hook and line eye 32.

From 2 to 8 pairs of fine, insect-like, semi-rigid, resilient legs 28 preferably of fairly stiff thread like or filament material such a Nylon or polyolefin are mounted on the body portion and protrude outwardly therefrom. The legs are preferably provided with small globules 29 of plastic material such as one could form by fusing the ends of stiff polypropylene filament. The globules are readily seen as feet by predators. A throat-like segment 30 of fibrous and preferably fuzzy material is affixed to the underside of the shank section and wraps substantially one half the way around the shank section. A patch 36 of white or stark color preferably is provided by any means such as a spot of weighted paint or adhesive material to the underside of the tail end 18. The patch preferably contains sufficient weighted material, for example, from about 0.0001 oz to about 0.06 oz. of zinc or the like for each inch of body portion length, for lures of about the preferred dimensions given below. This weight exerts slight drag on the lure as the head portion of the lure falls downwardly thru the water on a loose line, and also tends to drag the lure tail downwardly and toward the lure head giving an undulating motion to the lure body. The ratio of combined head and hook weight to patch weight is preferably from about 50/1 to about 200/1. A typical head weight per se is from about 1/64 to about 1/4 oz. for a range of body sizes of from about 1.5 in. to about 4.5 in.

The various parts of the lure can be of any size and any different color or decorative ornamentation, or scenting such as to enhance the physical attributes of the lure and render it irresistible. The lure preferably is from about 1/64 in. to about 3/16 in. thick thru the body portion is from about 1 in. to about 5 in. in total length, and has a width of from about 3/16 in. to about 1.0 in. In a highly preferred embodiment the body portion is of flexible stretchable woven fabric of from about 1/32 to about 1/8 inches thick, about 1/4 inch wide, and about 2 inches long, the bulbous nose section being about 3/16 inch in diameter, and the shank section being about 1/4 inch long.

The invention has been described in detail with particular reference to preferred embodiments thereof, but it will be understood that variations and modifications will be effected with the spirit and scope of the invention.

I claim:

1. A fishing lure comprising a substantially flat, elongated body portion having a generally rectangular outline and having a dorsal side and an underside and generally parallel side edges, a front end and a tail end and comprised of highly flexible material such as to be wiggly deformable by small water currents generated when pulled through water, a head portion on said front end and having a forwardly facing insect-like bulbous nose section integral with a rearwardly directed shank section, a weighted patch affixed to said underside of said body portion adjacent said tail end thereof, wherein said patch is considerably lighter than said head portion, forwardly facing hook means affixed to said head portion and depending outwardly and downwardly from said underside, multiple pairs of fine, insect-like, semi-rigid, resilient legs mounted on said body portion and protruding outwardly therefrom, a throat-like segment of fibrous material affixed to the underside of said shank section, and a line eye mounted on the underside of said nose section.

2. The lure of claim 1 wherein two pairs of legs stick out generally laterally from each side edge of said body portion, and one pair of legs stick out generally longitudinally from said tail end edge of said body portion.

3. The lure of claim 1 wherein said body portion is of water insoluble, bulky fabric having a thickness of from about $\frac{1}{32}$ inch to about $\frac{1}{8}$ inch.

* * * * *